United States Patent [19]
Robinson

[11] Patent Number: 5,238,277
[45] Date of Patent: Aug. 24, 1993

[54] SCOOP FOR PET LITTER

[76] Inventor: Scott F. Robinson, 1122 Indian Pipe La., Zionsville, Ind. 46077

[21] Appl. No.: 966,367

[22] Filed: Oct. 26, 1992

[51] Int. Cl.$^5$ .......................... B07B 1/02; A01K 29/00
[52] U.S. Cl. ........................................ 294/1.3; 294/55; 209/417
[58] Field of Search ...................... 294/1.3, 1.4, 49, 55, 294/55.5; 209/417, 418, 419; 15/257.1

[56] References Cited

U.S. PATENT DOCUMENTS

| D. 233,158 | 10/1974 | Lowe. | |
|---|---|---|---|
| D. 255,951 | 7/1980 | Halls et al. | |
| D. 256,173 | 7/1980 | Rigney. | |
| D. 309,700 | 8/1990 | Goetz. | |
| D. 314,254 | 1/1991 | Gordon. | |
| 316,623 | 4/1885 | Hooper | 209/419 |
| D. 318,151 | 7/1991 | Moses. | |
| 690,522 | 1/1902 | Hodell | 294/55 |
| 917,251 | 4/1909 | Clement | 209/419 |
| 2,551,978 | 5/1991 | Smith. | |
| 3,976,564 | 8/1976 | Holder. | |
| 4,926,794 | 5/1990 | Yamamoto. | |
| 4,988,005 | 1/1991 | Graham. | |
| 5,076,627 | 12/1991 | Simon. | |

FOREIGN PATENT DOCUMENTS 394076  6/1933  United Kingdom ................ 209/419

Primary Examiner—David M. Mitchell
Assistant Examiner—Dean J. Kramer
Attorney, Agent, or Firm—Plews and Shadley

[57] ABSTRACT

A scoop for pet litter is disclosed for separating pet waste materials from unsoiled clumpable pet litter. A generally planar sifter portion has a plurality of parallel ribs, defining a plurality of slots through which unsoiled pet litter is sifted. Each rib has inwardly slanting upper sides, facilitating sifting. A front member having an inwardly slanted upper exterior surface is provided, and a handle is attached to sifter portion so as to be disposed in a plane parallel to and above the sifter portion.

17 Claims, 4 Drawing Sheets

SCOOP FOR PET LITTER

BACKGROUND OF THE INVENTION

1. Field of the Invention

The operation of removing pet waste materials from pet litter often involves the use of a specialized device to collect and separate the pet waste materials from the pet litter, and there is a need to have such a device that may be used to collect and separate pet waste materials rapidly and with a minimum number of physical operations by the user. The present invention generally relates to pet litter scoops, and more particularly concerns scoops for pet litter that are capable of quickly, easily and efficiently removing pet waste material from clumpable pet litter.

2. Description of the Prior Art

In addition to the well-known characteristics of pet litter, recently available pet litter, often referred to as "European style," "scoopable," or "clumpable," is capable of forming clumps upon contact with moisture such as urine. As a result, there is a need to separate such clumps along with fecal matter from non-soiled pet litter present in a pet litter box. The separation operation may involve extensive searching through pet litter to discover pet waste materials covered over by the pet.

Devices for removing pet waste materials from pet litter are disclosed by U.S. Pat. Nos. 4,926,724, 5,076,627, Des. 233,158, and Des. 255,951. Devices for removing pet waste materials are disclosed by U.S. Pat. Nos. Des. 256,173, Des. 314,254, and Des. 318,151.

Despite the availability of such devices, there exists a need in the art for a scoop for pet litter that is capable of effectively and efficiently separating pet waste materials from unsoiled pet litter. Currently available scoops for pet litter typically require extensive searching for pet waste materials in the pet litter, and, in addition, have relatively large, horizontally disposed surfaces upon which unsoiled pet litter may remain during searching operations, requiring the user to repeatedly shake the scoop after lifting the scoop from the pet litter in order to cause the unsoiled pet litter to be sifted through the scoop, while simultaneously attempting to maintain any pet waste materials on the upper surface of the scoop. Moreover, in order to prevent pet waste materials from falling back into the pet litter during sifting, a scoop may be provided with walls along the sides and rear portion. The presence of walls along the sides and rear portion of the scoop tends to increase frictional drag as the scoop is moved through pet litter during searching operations, thereby increasing the physical effort required of the user.

A major feature to be considered in scoops for pet litter relates to decreasing the amount of time and effort required to clean a pet litter box by eliminating the searching operations for pet waste materials, and by reducing the amount of sifting required to remove pet waste materials from unsoiled pet litter, while at the same time providing a scoop for pet litter that is capable of movement through pet litter with relatively little physical effort by the user. To this end, there is a need in the art for a scoop for pet litter that is physically large enough to permit a large portion of a pet litter box to be cleaned at a single time, yet moves through pet litter with minimal resistance and requires relatively little time and effort by the user to sift unsoiled pet litter from pet waste materials.

SUMMARY OF THE INVENTION

In order to aid in the understanding of the present invention, it can be stated in essentially summary form that it is directed to a scoop for pet litter that is capable of quickly and easily separating pet waste materials from clumpable pet litter so that the pet waste materials may be disposed, yet prevents direct physical contact between the user and the pet waste materials.

It is an object of the present invention to provide a scoop for pet litter that is capable of separating pet waste materials from clumpable pet litter in a short period of time.

It is an object of the present invention to provide a scoop for pet litter that is capable of separating pet waste materials from clumpable pet litter in a pet litter box without searching and in a minimal number of operations.

It is an object of the present invention to provide a scoop for pet litter that is capable of separating pet waste materials from clumpable pet litter with minimal sifting of unsoiled pet litter from pet waste materials.

It is an object of the present invention to provide a scoop for pet litter that is capable of separating pet waste materials from clumpable pet litter with a relatively small amount of physical effort by the user.

It is another object of the present invention to provide a scoop for clumpable pet litter that is capable of rapid and easy cleaning.

It is another object of the present invention to provide a scoop for pet litter that may be easily stored and carried.

It is another object of the present invention to provide a scoop for pet litter that has a minimum number of sharp edges that may act to injure the user.

It is still another object of the present invention to provide a scoop for pet litter that is inexpensive to produce.

It is yet another object of the present invention to provide a scoop for pet litter of relatively simple construction with a minimum of components.

Further objects and advantages of the present invention will be apparent from a study of the following portion of the specification, the claims, and the attached drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
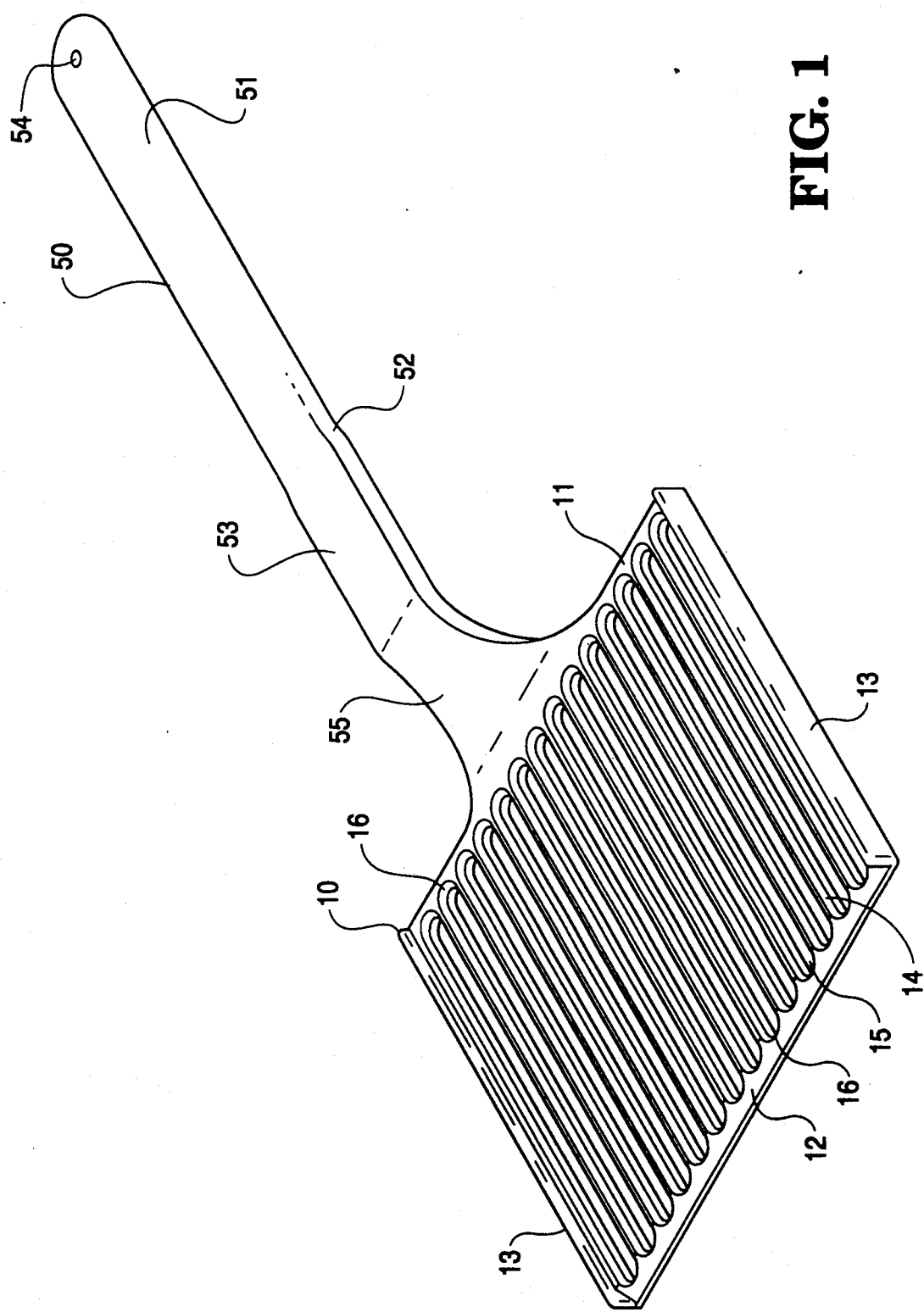
FIG. 1 is a front perspective view of a scoop for pet litter representing the present invention.
Figure 2:
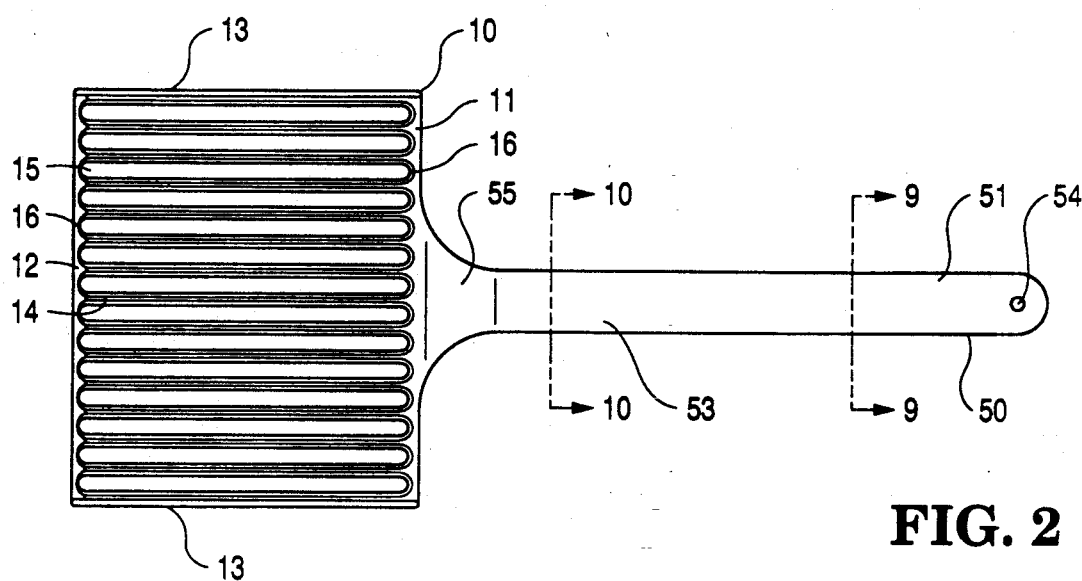
FIG. 2 is a top plan view of a scoop for pet litter representing the present invention.
Figure 3:
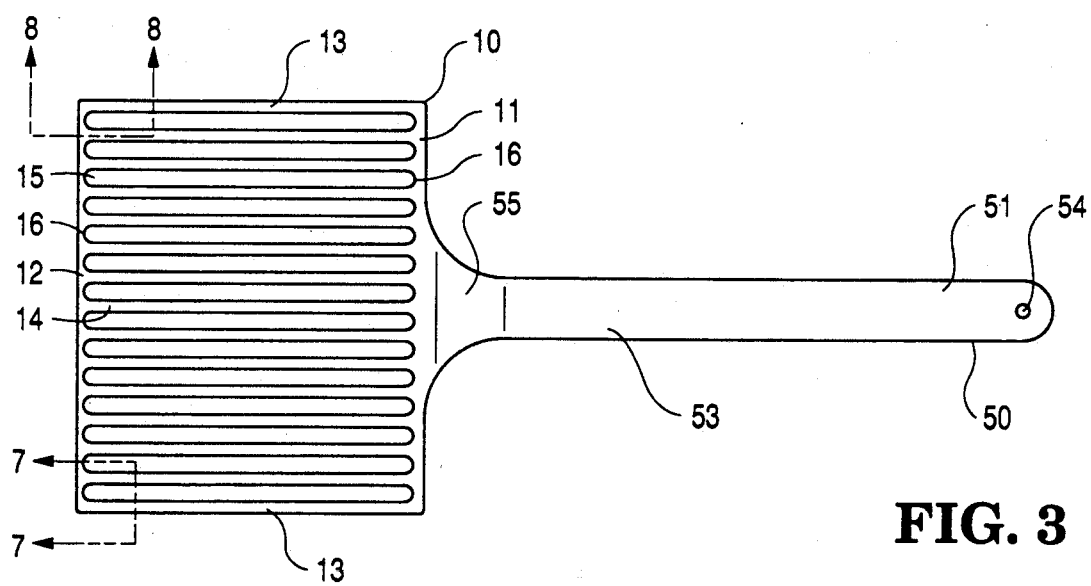
FIG. 3 is a bottom plan view of a scoop for pet litter representing the present invention.
Figure 4:
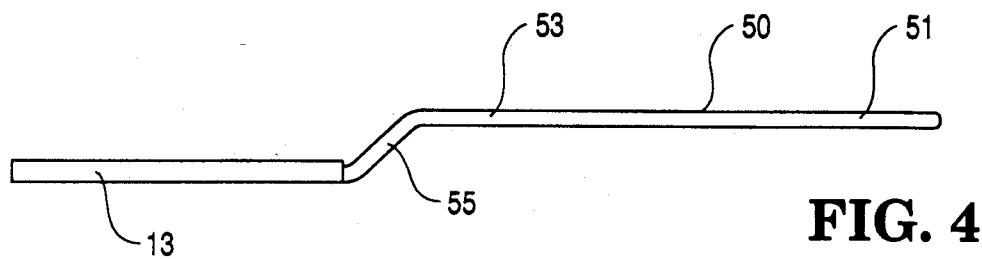
FIG. 4 is a side elevational view of a scoop for pet litter representing the present invention.

Referring now to the drawings for a detailed description of the present invention, reference is first made to FIGS. 1, 2, and 3, depicting planar, generally rectangular sifter portion 10 having rear member 11, front member 12 and mirror-image edge members 13. A plurality of parallel ribs 14 are disposed normal to and between rear member 11 and front member 12 and parallel to edge members 13, so as to define a plurality of slots 15 having sloped, generally arcuate ends 16 adjacent to rear member 11 and front member 12.

Figure 7:
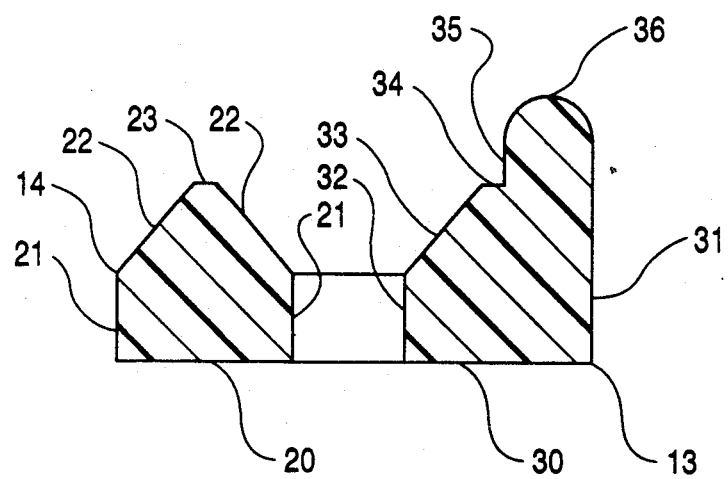
FIG. 7 is a sectional view taken along line 7—7 of FIG. 3.

As shown more clearly in FIG. 7, each rib 14 is formed to have rib lower surface 20 disposed parallel to the plane of sifter portion 10, opposing, parallel rib sides 21 disposed normal to rib lower surface 20, a pair of mirror-image rib slanted surfaces 22, each disposed to form an obtuse angle with respect to the adjacent rib side 21, and rib upper surface 23 disposed parallel to rib lower surface 20 and between rib slanted surfaces 22.

Also as shown in FIG. 7, edge member 13 is formed to have edge member lower surface 30 disposed coplanar to rib lower surface 20, edge member exterior side 31 disposed normal and adjacent to edge member lower surface 30, edge member interior side 32 disposed parallel to edge member exterior side 31 and normal and adjacent to edge member lower surface 30, edge member slanted surface 33 disposed to form an obtuse angle with respect to edge member interior side 32, ledge 34 disposed adjacent to edge member slanted surface 33 and parallel to edge member lower surface 30, and edge member vertical surface 35, disposed normal to ledge 34 and adjacent to half-round edge member upper surface 36.

Figure 5:
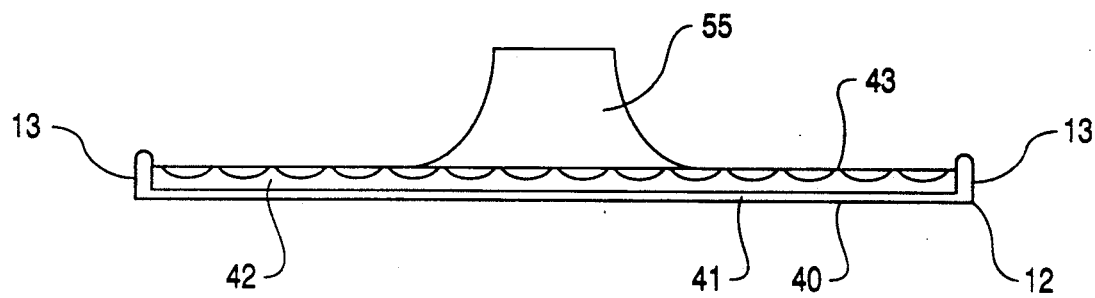
FIG. 5 is a front elevational view of a scoop for pet litter representing the present invention.
Figure 6:
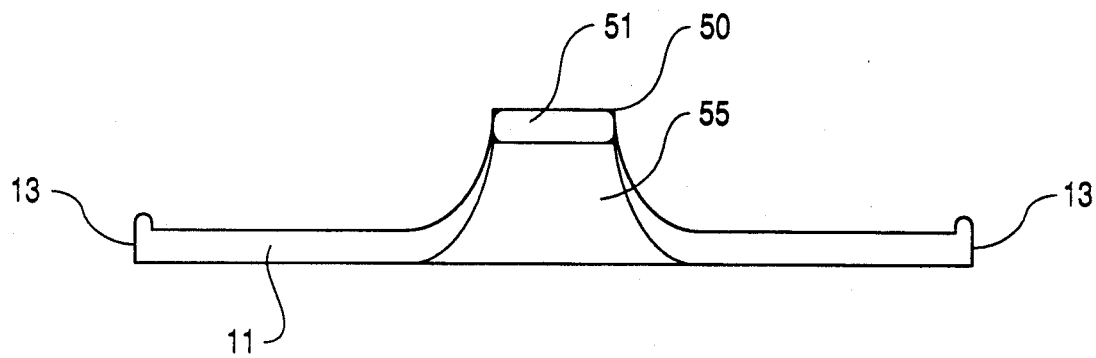
FIG. 6 is a rear elevational view of a scoop for pet litter representing the present invention.
Figure 8:
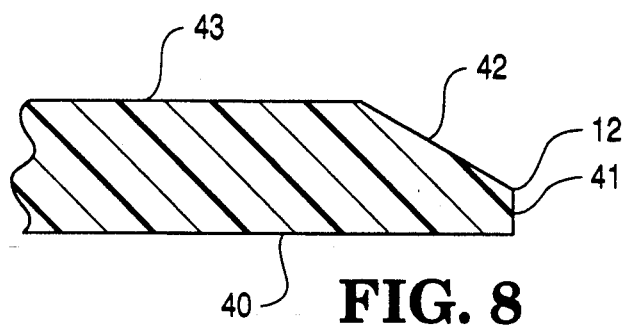
FIG. 8 is a sectional view taken along line 8—8 of FIG. 3.

As shown in FIGS. 5 and 8, front member 12 has front member lower surface 40 coplanar with rib lower surface 20, front member leading surface 41 disposed normal and adjacent to front member lower surface 40, front member slanted surface 42 forming an obtuse angle with respect to front member leading surface 41, and front member upper surface 43 disposed parallel to front member lower surface 40 and adjacent to front member slanted surface 42.

Figure 9:
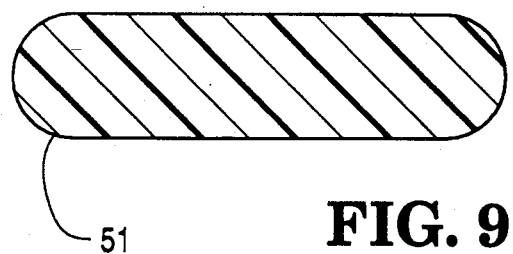
FIG. 9 is a sectional view taken along line 9—9 of FIG. 3.
Figure 10:
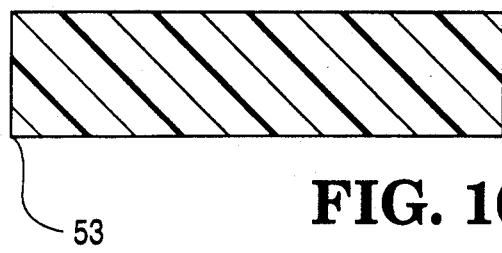
FIG. 10 is a sectional view taken along line 10—10 of FIG. 2.

Referring now to FIGS. 1, 2, 3, 4, and 6, handle 50, having distal portion 51, transition portion 52, proximate portion 53, and defining handle hole 54, is attached to sifter portion 10 by curved, tapered neck 55 so that handle 50 is disposed normal to rear member 11 and lies in a plane parallel to and above the plane of rib upper surfaces 23. As depicted in FIG. 9, distal portion 51 is generally oval in cross-section, while proximate portion 53 is rectangular in cross-section as shown in FIG. 10.

In use, the present invention is grasped by distal portion 51 and pushed generally vertically downward through pet litter contained in a pet litter box, so that front member leading surface 41 is generally parallel to the surface of pet litter, until front member leading surface 41 is proximate to the bottom interior surface of the pet litter box. Next, front member 12 is slidably pushed along the bottom interior surface of the pet litter box, while handle 50 is rotated downward and the present invention is rotated about an axis defined by front member leading surface 41, until rib lower surfaces 20, edge member lower surfaces 30, and front member lower surface 40 are generally parallel and proximate to the bottom interior surface of the pet litter box and handle 50 is generally parallel with and above the upper surface of the pet litter. As shown in FIG. 5, the cross-section presented by sifter portion 10 is relatively small, and by virtue of front member slanted surface 42, movement of sifter portion 10 through the pet litter as described may be accomplished with relatively little force. The present invention is then lifted upward through the pet litter. Due to the cross-section of ribs 14 and edge members 13 as depicted in FIG. 7, and due to the relative dimensions of ribs 14 and slots 15, essentially all unsoiled pet litter automatically sifts through slots 15 while pet waste material and clumped pet litter is supported on rib upper surfaces 23 and separated from the unsoiled pet litter. The pet waste material and clumped pet litter may then be conveniently disposed. In the event that the area of the pet litter box is larger than the area of sifter portion 10, it may be necessary to repeat the above-described procedure.

In order that the present invention be capable of the most efficient use, the area of sifter portion 10 should be chosen as large as possible to miminize the number of operations necessary to clean a pet litter box, while at the same time due consideration must be given to the physical effort required by the user, which increases with the cross-section presented as the present invention is slidably pushed through the pet litter as previously described. In addition, as the present invention is lifted upward through the pet litter, resistance will occur where the pet litter comes into contact with rib slanted surfaces 22, rib upper surface 23, edge member slanted surfaces 33, ledge 34, and half-round edge member upper surfaces 36. To achieve a balance between ease and efficiency of use of the present invention while minimizing the need for the user to manually sift the unsoiled pet litter from the pet waste materials, the dimensions of the present invention may be chosen as follows.

The perpendicular distance between rear member 11 and front member 12 may be chosen to be approximately 8 inches, while the perpendicular distance between edge members 13 may be chosen to be approximately 9.5 inches. In order to prevent unsoiled pet litter from remaining on rib upper surfaces 23 and ledges 34 after the present invention is lifted upward through the pet litter while avoiding the use of sharp edges that might injure the user, the width of each rib upper surface 23 and each ledge 34 may be chosen to be approximately 1/32 inch. The width of each rib lower surface 20 may be chosen to be approximately ¼ inch, and the height of each rib side 21 may be chosen to be approximately ⅛ inch, forming an angle of approximately 140 degrees between each rib slanted surface 22 and the adjacent rib side 21, and an angle of approximately 130 degrees between each rib slanted surface 22 and the adjacent rib upper surface 23. Similarly, the angle formed by each edge member slanted surface 33 and the adjacent edge member interior side 32 will be approximately 140 degrees, and the angle formed by each edge member slanted surface 33 and the adjacent ledge 34 will be approximately 130 degrees. The width of each slot 15 may be chosen to be approximately ⅜ inch. The offset of handle 50 with respect to the plane of rib upper surfaces 23 may be chosen so that when rib lower surfaces 20 is proximate to the bottom interior surface of the pet litter box, handle 50 is maintained above the upper surface of the pet litter. Balancing the concern for user safety with the desire to mimimize resistance to movement of the present invention through pet litter, front member leading surface 41 may be chosen to be relatively small, approximately 1/16 inch in height, and front member slanted surface 42 may be disposed to form an angle of approximately 120 degrees with respect to front member leading surface 41.

The present invention may be formed from a resilient, non-ferrous, easily cleaned material such as plastic, thereby achieving the required structural integrity and providing resistance to corrosion while being suitable for cleaning.

The present invention having been described in its preferred embodiment, it is clear that it is susceptible to numerous modifications and embodiments within the ability of those skilled in the art and without the exercise of the inventive faculty. Accordingly, the scope of the present invention is defined by the scope of the following claims.

What is claimed is:

1. Scoop for pet litter comprising:

a generally planar sifter portion having a plurality of parallel ribs, two longitudinal, opposing, mirror-image edge members, and a front member, said ribs disposed in the plane of said sifter portion and defining a plurality of parallel slots, the upper portion of each rib having two longitudinal, generally opposing rib slanted surfaces forming an acute first angle, said edge members disposed parallel to said ribs and at opposite exterior sides of and in the plane of said sifter, the upper portion of each edge member having a longitudinal edge member slanted surface disposed generally parallel to the distal rib slanted surface of the adjacent rib, a longitudinal edge member vertical surface disposed normal to the plane of said sifter portion, and a longitudinal half-round edge member upper surface disposed adjacent to said edge member vertical surface, and said front member disposed in the plane of said sifter portion and normal to said ribs and having a front member slanted surface forming an acute second angle with respect to the plane of said sifter portion;

a handle; and means for attaching said handle to said sifter portion so that said handle is disposed in a plane generally parallel to and above the plane of said ribs.

2. Scoop for pet litter as defined in claim 1, wherein said means for attaching said handle to said sifter portion disposes said handle normal to said front member.

3. Scoop for pet litter as defined in claim 2, wherein said sifter portion is generally rectangular.

4. Scoop for pet litter as defined in claim 3, wherein said first angle is approximately 80 degrees.

5. Scoop for pet litter as defined in claim 4, wherein said second angle is approximately 30 degrees.

6. Scoop for pet litter as defined in claim 5, wherein said handle has a distal portion of generally oval cross-section, a proximate portion of generally rectangular cross-section, and a transition portion disposed between said distal portion and said proximate portion.

7. Scoop for pet litter as defined in claim 6, wherein said means for attaching said handle to said sifter portion comprises a tapered, curved neck.

8. Scoop for pet litter comprising:

a generally rectangular, planar sifter portion having a plurality of parallel ribs, two mirror-image edge members, a front member, and a rear member, said ribs disposed in the plane of said sifter portion and defining a plurality of parallel slots, each rib having a longitudinal rib lower surface disposed parallel to the plane of said sifter portion, two longitudinal opposing, parallel rib sides, each disposed normal and adjacent to said rib lower surface, two longitudinal, mirror-image, opposing rib slanted surfaces, each disposed adjacent to one of said rib sides and forming an obtuse first angle with respect to the adjacent rib side, and a rib upper surface disposed between said rib slanted surfaces and parallel to said rib lower surface, said edge members disposed in the plane of said sifter portion and parallel to said ribs, each edge member having a longitudinal edge member lower surface coplanar with said rib lower surfaces, a longitudinal edge member exterior side disposed adjacent and normal to said edge member lower surface, a longitudinal edge member interior side disposed adjacent and normal to said edge member lower surface, a longitudinal edge member slanted surface disposed adjacent to said edge member interior side and forming an obtuse second angle with respect to said edge member interior side, a longitudinal ledge disposed adjacent to said edge member slanted surface and parallel to said edge member lower surface, a longitudinal edge member vertical surface disposed normal to said ledge, and a longitudinal half-round edge member upper surface disposed adjacent to said edge member vertical surface, said front member disposed in the plane of said sifter portion and attached to a first end of and normal to said ribs, said front member having a front member lower surface disposed coplanar with said rib lower surfaces, a front member leading surface disposed normal to said front member lower surface, a front member slanted surface disposed adjacent to said front member leading surface and forming an obtuse third angle with respect to said front member leading surface, and a front member upper surface disposed adjacent to said front member leading surface and parallel to said front member lower surface, and said rear member disposed in the plane of said sifter portion and attached to a second end of and normal to said ribs;

a handle; and means for attaching said handle to said rear member so that said handle is disposed normal to said rear member and lies in a plane parallel to and above the plane of said rib upper surfaces.

9. Scoop for pet litter as defined in claim 8, wherein said first and second angles are each approximately 140 degrees.

10. Scoop for pet litter as defined in claim 9, wherein said handle has a distal portion of generally oval cross-section, a proximate portion of generally rectangular cross-section, and a transition portion disposed between said distal portion and said proximate portion.

11. Scoop for pet litter as defined in claim 10, wherein said means for attaching said handle to said sifter portion comprises a tapered, curved neck.

12. Scoop for pet litter as defined in claim 8, wherein said third angle is approximately 120 degrees.

13. Scoop for pet litter as defined in claim 12, wherein said handle has a distal portion of generally oval cross-section, a proximate portion of generally rectangular cross-section, and a transition portion disposed between said distal portion and said proximate portion.

14. Scoop for pet litter as defined in claim 13, wherein said means for attaching said handle to said sifter portion comprises a tapered, curved neck.

15. Scoop for pet litter comprising:
- a plurality of parallel ribs defining a plurality of parallel slots, each rib having a longitudinal rib lower surface, two longitudinal opposing, parallel rib sides, each disposed normal and adjacent to said rib lower surface, two longitudinal, mirror-image, opposing rib slanted surfaces, each disposed adjacent to one of said rib sides and forming an angle of approximately 140 degrees with respect to the adjacent rib side, and a rib upper surface disposed between said rib slanted surfaces and parallel to said rib lower surface;
- two mirror-image edge members, each disposed in the plane of and parallel to said ribs, each edge member having a longitudinal edge member lower surface coplanar with said rib lower surfaces, a longitudinal edge member exterior side disposed adjacent and normal to said edge member lower surface, a longitudinal edge member interior side disposed adjacent and normal to said edge member lower surface, a longitudinal edge member slanted surface disposed adjacent to said edge member interior side and forming an angle of approximately 140 degrees with respect to said edge member interior side, a longitudinal ledge disposed adjacent to said edge member slanted surface and parallel to said edge member lower surface, a longitudinal edge member vertical surface disposed normal to said ledge, and a longitudinal half-round edge member upper surface disposed adjacent to said edge member vertical surface;
- a front member disposed in the plane of said ribs and attached to a first end of and normal to said ribs, said front member having a front member lower surface disposed coplanar with said rib lower surfaces, a front member leading surface disposed normal to said front member lower surface, a front member slanted surface disposed adjacent to said front member leading surface and forming angle of approximately 120 degrees with respect to said front member leading surface, and a front member upper surface disposed adjacent to said front member leading surface and parallel to said front member lower surface;
- a rear member disposed in the plane of ribs and attached to a second end of and normal to said ribs;
- a handle; and
- means for attaching said handle to said rear member so that said handle is disposed normal to said rear member and lies in a plane parallel to and above the plane of said rib upper surfaces.

16. Scoop for pet litter as defined in claim 15, wherein said handle has a distal portion of generally oval cross-section, a proximate portion of generally rectangular cross-section, and a transition portion disposed between said distal portion and said proximate portion.

17. Scoop for pet litter as defined in claim 16, wherein said means for attaching said handle to said sifter portion comprises a tapered, curved neck.

* * * * *